US006841925B2

(12) United States Patent
Lee et al.

(10) Patent No.: US 6,841,925 B2
(45) Date of Patent: Jan. 11, 2005

(54) DEFLECTION YOKE

(75) Inventors: Song Geun Lee, Suwon-shi (KR); Ho Jin Cho, Kimpo-shi (KR); Kwang Yun Choi, Uiwang-shi (KR)

(73) Assignee: Samsung Electro-Mechanics, Co., Ltd., Kyungki-Do (KR)

( * ) Notice: Subject to any disclaimer, the term of this patent is extended or adjusted under 35 U.S.C. 154(b) by 229 days.

(21) Appl. No.: 10/323,079

(22) Filed: Dec. 19, 2002

(65) Prior Publication Data

US 2003/0227245 A1 Dec. 11, 2003

(30) Foreign Application Priority Data

Jun. 7, 2002 (KR) ........................................ 2002-31877
Jun. 7, 2002 (KR) ........................................ 2002-31878

(51) Int. Cl.[7] .......................... H01J 29/70; H04N 5/655

(52) U.S. Cl. ....................... 313/440; 348/829; 348/830; 348/831

(58) Field of Search ................................ 313/440, 444; 335/209–212, 296; 348/829–831

(56) References Cited

FOREIGN PATENT DOCUMENTS

JP 04-098740 * 3/1992 ............ H01J/29/82

* cited by examiner

*Primary Examiner*—Nimeshkumar D. Patel
*Assistant Examiner*—Sharlene Leurig
(74) *Attorney, Agent, or Firm*—Darby & Darby

(57) ABSTRACT

Disclosed is a deflection yoke comprising: a fastening band of a ring shape assembled on an outer periphery of a neck portion in a coil separator by a fixing manner, provided for being extended and contracted; a pair of flanges bent and extended from both ends of the fastening band, on which a through hole is formed; a yoke clamp for generating fastening force by tightening of a bolt for passing through a pair of through holes, then being tightened by a nut; a bending portion projected on an outer side along the periphery of the fastening band, whose object contact plane for coming in contact with an outer periphery of the neck portion is divided into at least two or more.

8 Claims, 7 Drawing Sheets

DEFLECTION YOKE

BACKGROUND OF THE INVENTION

1. Field of the Invention

The present invention relates to a deflection yoke adopted for a cathode ray tube (CRT), and particularly to a yoke clamp for fixing a deflection yoke in a cathode ray tube.

2. Background of the Related Art

Generally, a cathode ray tube (CRT) of TV set or monitor has a deflection yoke for accurately deflecting three color-beam scanned from an electron gun on a fluorescent film plastered on a screen plane of the CRT, and this yoke is one of most important elements among magnetic apparatus of the CRT, for deflecting the electron beam discharged from the electron gun so that an electric signal transmitted to time series may be regenerated as an image on the screen of the CRT.

Namely, as an electron beam discharged from an electronic gun goes straight onto a screen by high voltage, the electron beam simply illuminates a central fluorescent body on the screen only. So, a deflection yoke is an element for deflecting the electron beam so that the electronic beam may be reached to the fluorescent film in a canned order from outside. Such yoke accurately deflects the electron beam onto the fluorescent film plastered on the screen of the CRT, using phenomenon that the electron beam is given force due to magnetic field generated by the yoke when the electron beam passes through that magnetic field, by which proceeding direction of the electron beam is altered.

FIG. 1 is a side view illustrating a CRT for which the general deflection yoke is adopted.

As shown in FIG. 1, a deflection yoke 4 is positioned on RGB electron gun portion 3 of a cathode ray tube (CRT) 1, for deflecting an electron beam scanned from the electron gun onto a fluorescent film plastered on a screen plane 2.

Such deflection yoke 4 has a coil separator 10, a kind of injection material. Here, the coil separator 10 is provided for insulating a horizontal deflection coil 15 and a vertical deflection coil 16, and at the same time, arranging positions of these coils with reasonable precision, and comprises a screen portion 11*a* combined to one side of a screen plane 2 of the CRT 1; a rear cover 11*b*; and a neck portion 12 extended from a central portion of the rear cover 11*b*, for being combined to the electron gun portion 3 of the CRT 1.

More specifically, the coil separator 10 has, on its inner and outer peripheries, a horizontal deflection coil 15 and a vertical deflection coil 16 for generating horizontal deflection magnetic field and vertical deflection magnetic field by power supply applied from outside, respectively. In addition, a ferrite core 14 enclosing the vertical deflection coil 16 is further provided for reinforcing vertical magnetic field.

Here, though the horizontal deflection coil 15 and the vertical deflection coil 16 provided respectively on the inner and outer peripheries of the coil separator 10, are not shown, these deflection coils are extruded onto a circuit board positioned on an outer periphery of the coil separator 10, for being connected to a terminal so as to be provided with power supply.

In the meantime, the neck portion 12 has, on its outer periphery, a convergence yoke 5 for controlling convergence that accurately concentrates an electron beam scanned from the electron gun 3 of the CRT 1, on a center of the screen 2. Such convergence yoke 5 is fixed on the electron gun 3 of the CRT1 together with the neck portion 12 by means of a yoke clamp (not shown).

FIG. 2 is an exploded, perspective view for crucial part of a yoke clamp in a deflection yoke according to a related art and FIG. 3 is a cross-sectional view illustrating fastening status of a yoke clamp in a deflection yoke according to a related art.

As represented by FIG. 2 and FIG. 3, the neck portion 12 of the coil separator 10 has, on its outer periphery, a yoke clamp 200 as a means for fixing in the electron gun 3 of the CRT. Here, the yoke clamp 200 roughly comprises a fastening band 210 and a screw member.

The fastening band 210 is bending-molded so that a single member of lengthwise material having a predetermined width may form an approximate ring shape, whose both ends maintain a constant interval lest both the ends touch each other, whereby a diameter of the ring shape could be extended and contracted.

Also, such fastening band 210 has, on both its ends, a pair of flanges 220 bent and extended to the outside direction as shown in the picture, and these flanges 220 have a through hole 230 formed opposite each other on them.

The screw member comprises a bolt 300 and a nut 310. Here, the bolt 300 passes through the through hole 230 formed on a pair of the flanges 220, and the nut 310 is tightened on an end of the bolt 300, i.e., the end of the bolt 300 that passes through the through hole 230. Therefore, with fastening force by the bolt 300 and the nut 310, the fastening band 210 fastens an outer periphery of the neck portion 12, and resultantly, the neck portion 12 of the coil separator 10 is fixed with being mounted on the electron gun 3 of the CRT1.

In case of the deflection yoke 4 of a related art, much assembling force is partially exerted on the electron gun 3 of the CRT 1 during process of fixing the deflection yoke 4 in the electron gun 3 of the CRT by means of the yoke clamp 200 of a relate art described above, and a problem that the electron gun 3 of the CRT, made of glass is destroyed due to such partial assembling force, is caused.

Reason for such problem is that when fastening force is applied on the fastening band 210 by the bolt 300 and the nut 310, the fastening band 210 is not fastened uniformly on the whole, but misshapen on some of its portion, not always retaining constant perfect circle.

Therefore, there are problems in that considerable attention should be paid on fastening force of the yoke clamp 200 upon mounting the deflection yoke 4 onto the electron gun 3 of the CRT 1, whereby work efficiency drops down remarkably and product defective proportion due to destruction of the CRT 1 upon mounting work of the deflection yoke 4, soars up.

SUMMARY OF THE INVENTION

An object of the invention is to solve at least the above problems and/or disadvantages and to provide at least the advantages described hereinafter.

Accordingly, one object of the present invention is to solve the foregoing problems by providing a deflection yoke capable of distributing fastening force of a yoke clamp, preventing destruction of the CRT due to excessive assembling force, thereby reducing destruction of the CRT during assembly process and pursuing quality improvement of the product.

The foregoing and other objects and advantages are realized by a deflection yoke comprising: a coil separator of a conic shape, having a screen portion of a large diameter and a neck portion of a small diameter, for being combined to a screen plane and an electron gun portion of the CRT, respectively, and having a horizontal deflection coil and a vertical deflection coil on its inner periphery and outer periphery, respectively; a fastening band of a ring shape assembled on an outer periphery of the neck portion in the coil separator by a fixing manner, provided for being extended and contracted; a yoke clamp including fastening members to assemble the fastening band; and a bending portion projected on an outer side along the periphery of the fastening band, whose object contact plane for coming in contact with an outer periphery of the neck portion is divided into at least two or more.

One preferred characteristic of the present invention, at least two or more of the bending portions are provided along the periphery of the fastening band with some interval intervened, and are formed on a middle portion in a width direction of the fastening band.

Another preferred characteristic of the present invention, the bending portion is formed on the middle portion in a width direction such that its width is about 50% of a width of the fastening band.

According to another aspect of the invention, the fastening members for being assembled to a pair of flanges bent and extended from both ends of the fastening band, include a bolt for passing through a pair of through holes, and a nut for being tightened to this bolt.

And a deflection yoke comprises: a coil separator of a conic shape, having a screen portion of a large diameter and a neck portion of a small diameter, for being combined to a screen plane and an electron gun portion of the CRT, respectively, and having a horizontal deflection coil and a vertical deflection coil on its inner periphery and outer periphery, respectively; a fastening band of a ring shape assembled on an outer periphery of the neck portion in the coil separator by a fixing manner, provided for being extended and contracted; a yoke clamp including fastening members to assemble the fastening band; and a slit of a long hole shape provided on a middle portion in a width direction along a periphery of the fastening band, for distributing, and transferring fastening force by dividing object contact plane contacted with an outer periphery of the neck portion into at least two or more.

One preferred characteristic of the present invention, at least two or more of the slits are provided along the periphery of the fastening band with some interval intervened.

Another preferred characteristic of the present invention, the slit is formed on a middle portion in a width direction such that its width is about 50% of a width of the fastening band.

Another preferred characteristic of the present invention, the fastening members for being assembled to a pair of flanges bent and extended from both ends of the fastening band, include a bolt for passing through a pair of through holes, and a nut for being tightened to this bolt.

BRIEF DESCRIPTION OF THE DRAWINGS

The invention will be described in detail with reference to the following drawings in which like reference numerals refer to like elements wherein.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF PREFERRED EMBODIMENTS

The following detailed description will present a deflection yoke according to a preferred embodiment of the invention in reference to the accompanying drawings.

Figure 4:
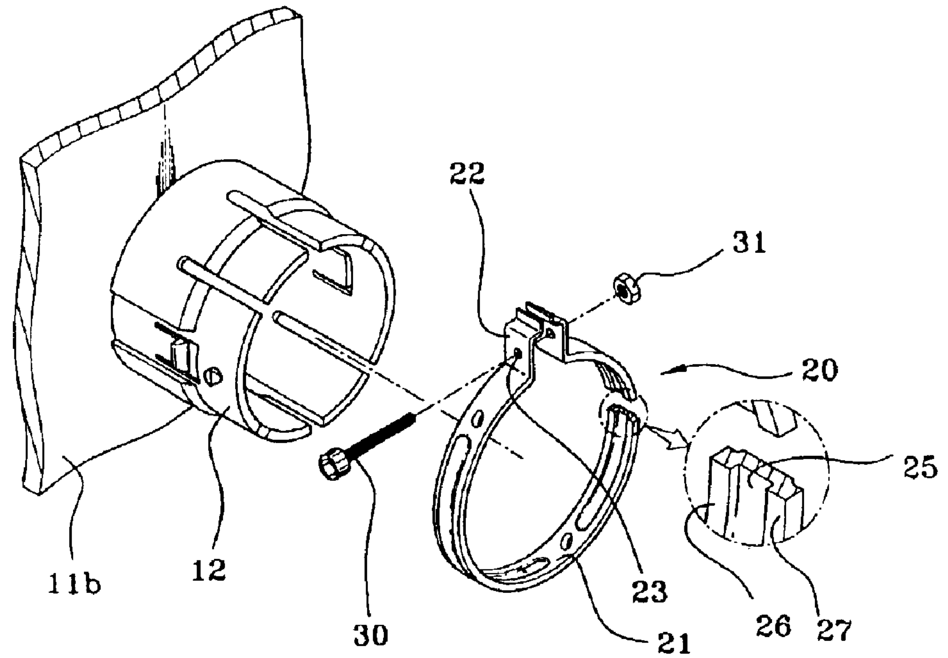
FIG. 4 through FIG. 6 are drawings illustrating a first embodiment of a yoke clamp for a deflection yoke according to the present invention.
Figure 5:
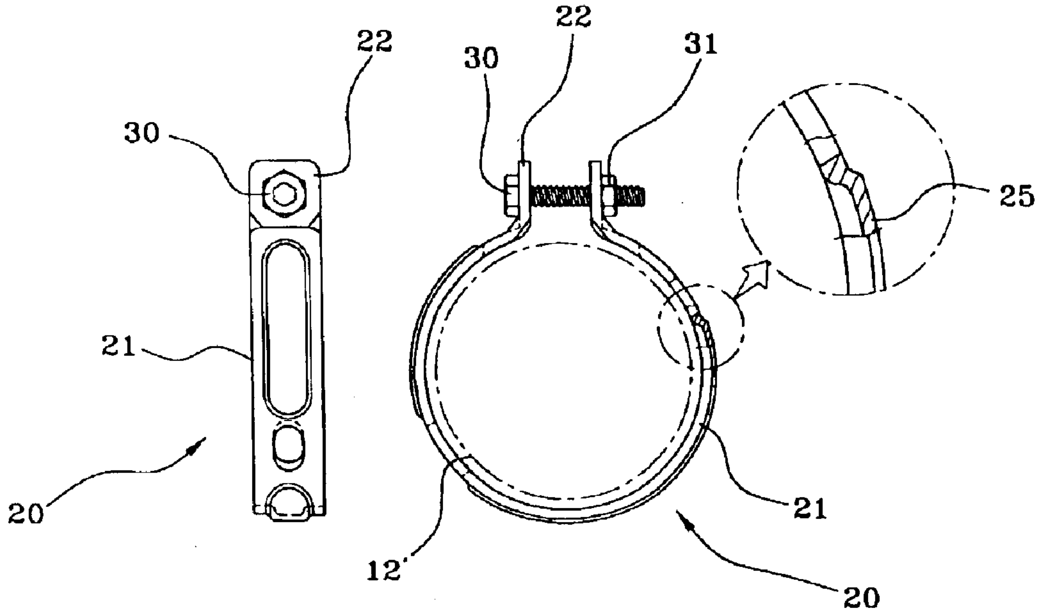
Figure 6:
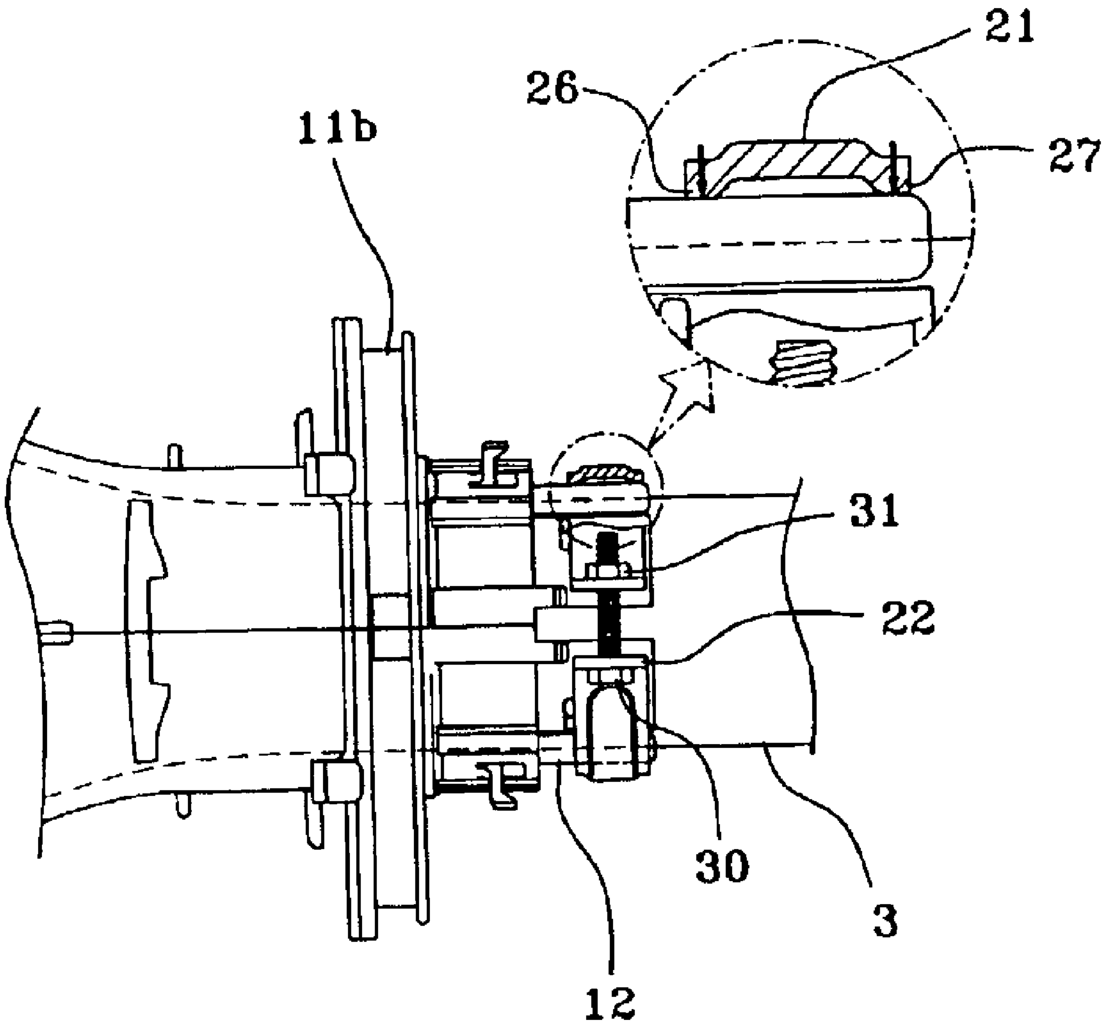

FIG. 4 through FIG. 6 are drawings illustrating a first embodiment of a yoke clamp in a deflection yoke according to the present invention. FIG. 4 is an exploded, perspective view for fastening portion of a yoke clamp in a deflection yoke according to the present invention, FIG. 5 is a drawing representing a yoke clamp in a deflection yoke according to the present invention, FIG. 6 is a drawing representing fastening status of a yoke clamp in a deflection yoke according to the present invention.

Hereinafter, detailed description for a yoke clamp will be made with reference to FIG. 1, with same reference numeral given for same element.

Figure 1:
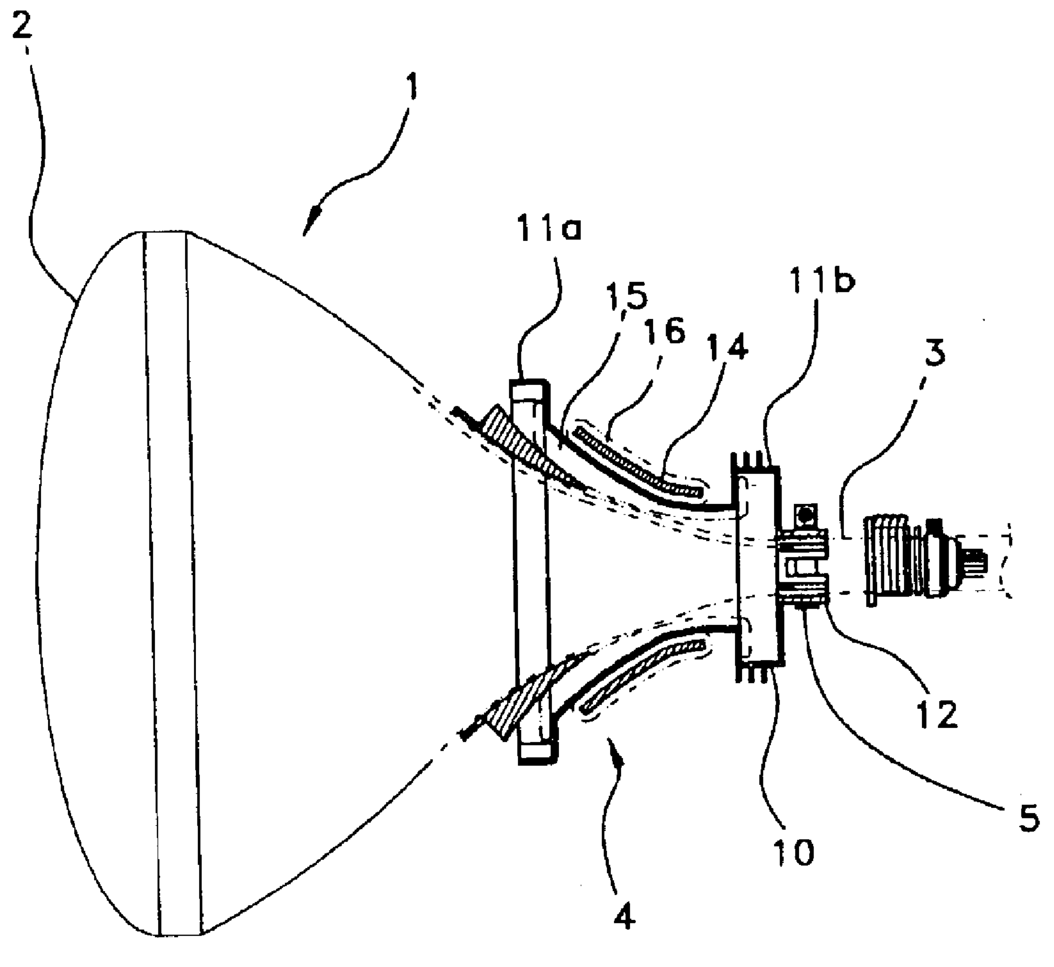
FIG. 1 (PRIOR ART)
FIG. 1 is a side view illustrating a CRT for which the general deflection yoke is adopted.
Figure 2:
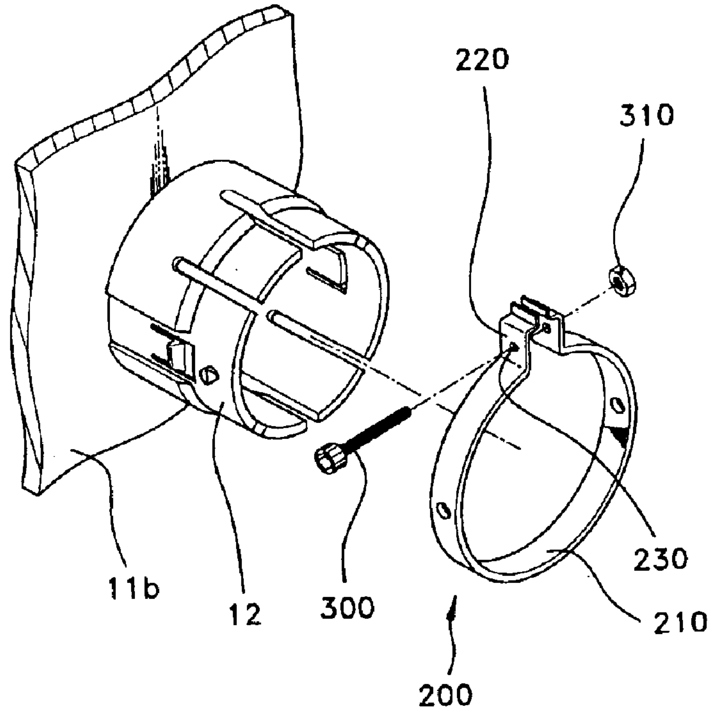
FIG. 2 (PRIOR ART)
FIG. 2 is an exploded, perspective view for crucial part of a yoke clamp in a deflection yoke according to a related art.
Figure 3:
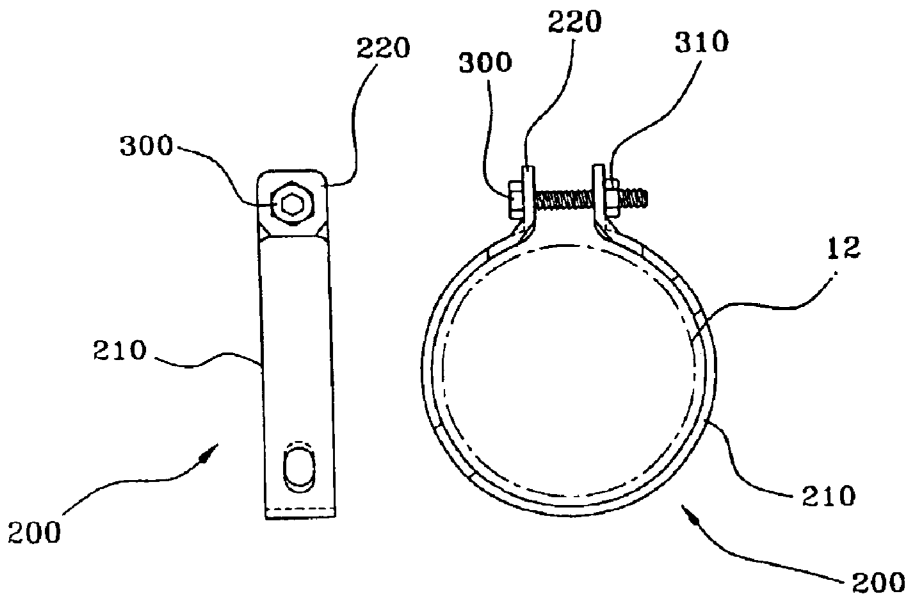
FIG. 3 (PRIOR ART)
FIG. 3 is a cross-sectional view illustrating fastening status of a yoke clamp in a deflection yoke according to a related art.

As shown in FIG. 1, a deflection yoke has a coil separator 10 of an about conic shape. Here, the coil separator 10 comprises a screen portion **11*a* of a large diameter, for being combined to one side of a screen plane of a CRT 1; a rear cover 11*b*; and a neck portion 12 of a small diameter extended from a central portion of the rear cover 11*b*, for being combined to an electron gun portion 3 of the CRT 1**.

Such coil separator 10 has, on its inner and outer peripheries, a horizontal deflection coil 15 and a vertical deflection coil 16 for generating horizontal deflection magnetic field and vertical deflection magnetic field by power supply applied from outside, respectively. These horizontal deflection coil 15 and the vertical deflection coil 16 are insulated and positioned precisely by the coil separator 10.

Also, the coil separator 10 has, on its outer periphery, a ferrite core 14 for enclosing the vertical deflection coil 16, thereby reinforcing deflection magnetic field.

In the meantime, the neck portion 12 of the coil separator 10 has a convergence yoke 5 on it as a means for compensating for positive convergence on a screen, and these convergence yoke 5 and the neck portion 12 are positioned and fixed on the electron gun portion 3 of the CRT 1.

Here, the yoke clamp 20 roughly comprises a fastening band 21 fixed on an outer periphery of the neck portion 12 of the coil separator 10, and a bolt 30 and a nut 31, as a fastening member, for playing a role to generate fastening force at this fastening band 21.

At the moment, the fastening band 21 is bent such that a lengthwise member of a plate shape having a predetermined width may form an ring shape, whose both ends maintain a constant interval lest both the ends touch each other, whereby a diameter of the ring shape could be elastically extended and contracted resultantly.

Also, the fastening band 21 has, on both its ends, flanges 22 bent and extended to the outside direction, and these flanges 22 have a through hole 23 formed opposite each other on them.

In the meantime, a bolt 30 of a predetermined length is inserted into the through hole 23 formed on a pair of the flanges 22, and a nut 31 is fastened at one end of this bolt 30, whereby fastening force is generated at the fastening band 21.

The foregoing structure is almost the same as structure of the deflection yoke according to a related art. But, characteristics of the present invention is to make partial bending portions on the fastening band 21 so that fastening force of the yoke clamp 20 may be distributed during process of mounting the deflection yoke on the CRT 1, and to form divided contact planes 26,27, thereby reducing destruction of the CRT 1, improving assembly efficiency.

Namely, as shown in FIG. 4 and FIG. 6, the fastening band 21 generates fastening force through fastening of the bolt 30 and the nut 31 described above, with being mounted on the neck portion 12 of the coil separator 10, and a bending portion 25 is formed such that the fastening force is distributed in a width direction and object contact planes is divided and comes in contact with an outer periphery of the neck portion 12.

More specifically, such bending portion 25 is divided such that the object contact planes may contact the outer periphery of the neck portion 12 with constant interval in a width direction, and as shown in FIG. 4 and FIG. 5, the bending portions 25 are projected in an outer side on a middle portion of a width direction.

Preferably, a plurality of such bending portions 25 are formed along a periphery of the fastening band 21 with constant interval, whereby fastening force is distributed uniformly when fastening force is exerted on a periphery of the neck portion 12 of the coil separator 10.

Though representing, as an example, a case in which a pair of bending portions 25 are formed on a periphery of the fastening band 21, the present invention is not restricted to this case, and a shape of the bending portion 25, its position and the number of bending portions 25 formed will be varied, provided that the fastening hand 21 is configured such that its contact plane, i.e., the contact plane of the fastening band 21, for coming in contact with the outer periphery of the neck portion 12 of the coil separator 10, is divided at least two or more and fastening force could be distributed accordingly.

In the meantime, a width of the bending portion 25 is formed by about 50% of a width of the fastening band 21, and various processing method could be used for molding the bending portion 25. For example, press working appropriate for mass production, could be used.

According to the present invention having the foregoing constitution, the fastening band 21 has, along its periphery, a plurality of the bending portion 25, whereby the object contact plane coming in contact with the outer periphery of the neck portion 12 of the coil separator 10, is divided into both sides with the bending portion 25 centered, and divided contact planes 26,27 are formed, and by such configuration, fastening force exerted by the fastening band 21 is distributed through such divided contact planes 26,27.

Therefore, fastening force of the fastening band 21 is exerted on the neck portion 12 through the two divided contact planes 26,27 and transferred to the electron gun portion 3 of the CRT 1. Namely, as fastening force of the yoke clamp 20 exerted on the CRT 1 is distributed and transferred through the divided contact planes, partially exerted excessive fastening force is distributed, whereby destruction of the CRT 1 is reduced.

As is apparent from the foregoing, a yoke clamp for a deflection yoke according to the present invention provides a strong point in that the bending portion formed along the periphery of the fastening band, distributes fastening force and resultantly fastening force of the yoke clamp exerted on the electron gun portion of the CRT, is distributed, and destruction of the CRT is reduced.

Therefore, destruction of the CRT during fastening process of the yoke clamp is reduced remarkably, whereby work and production efficiencies are improved and product reliability is secured.

Figure 7:
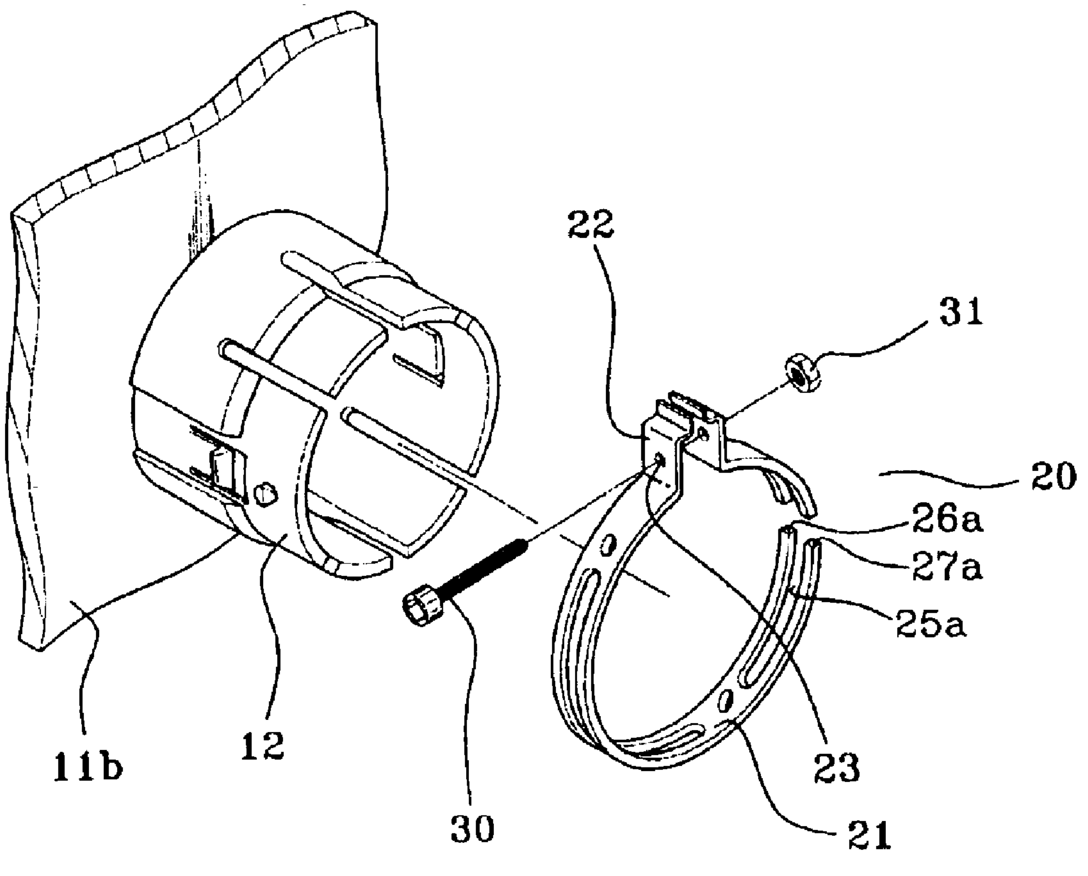
FIG. 7 through FIG. 9 are drawings illustrating a second embodiment of a yoke clamp for a deflection yoke according to the present invention.
Figure 8:
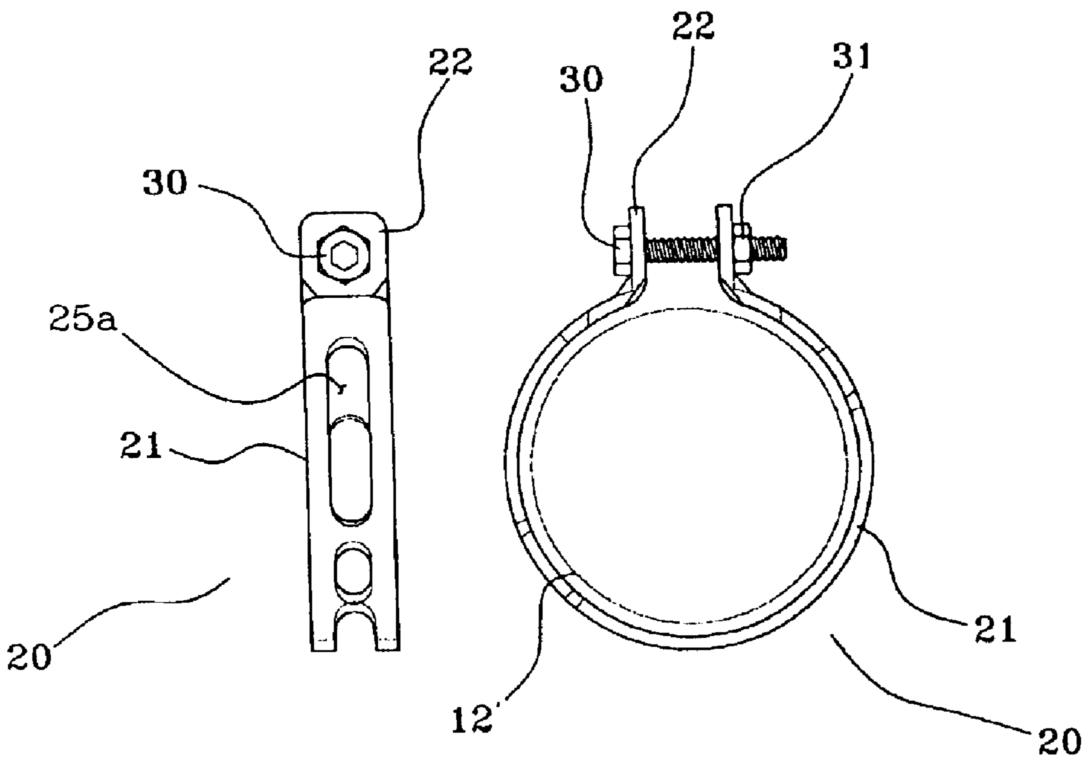
Figure 9:
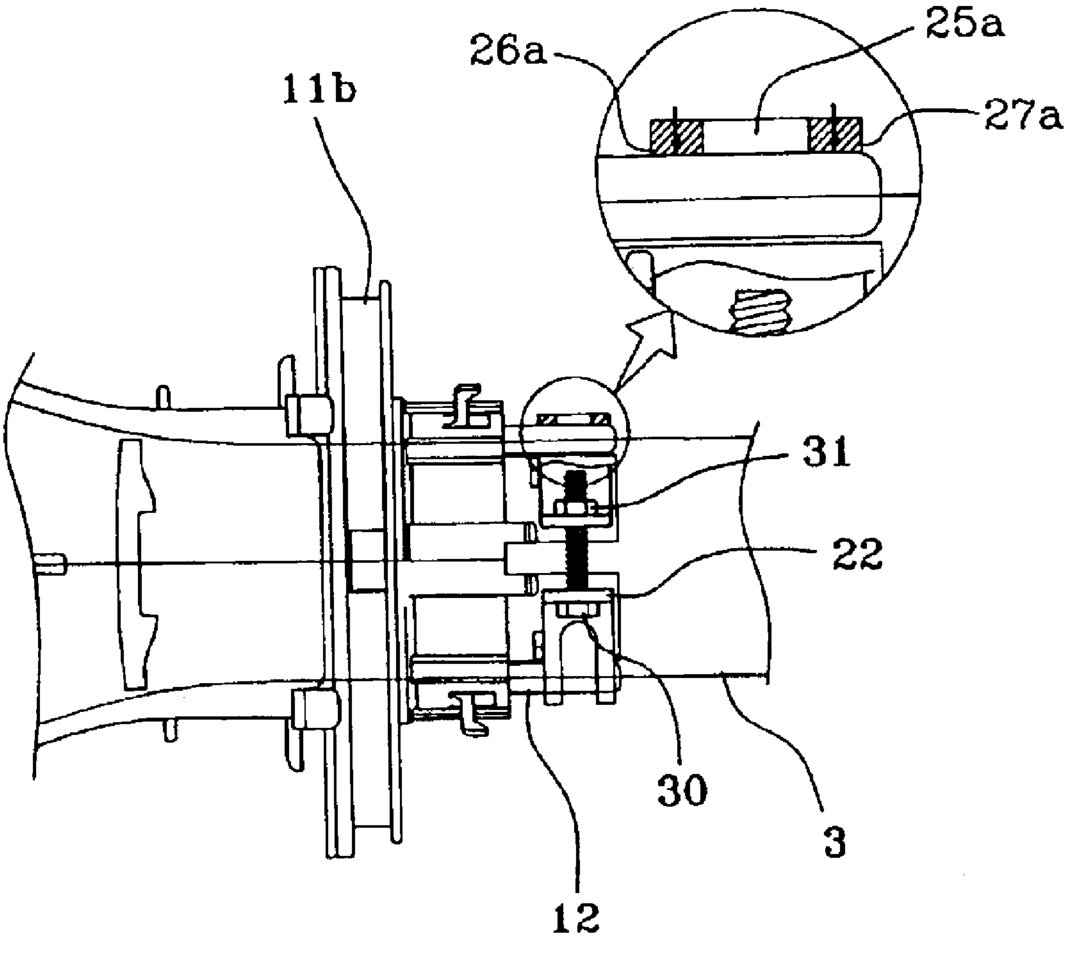

FIG. 7 through FIG. 9 are drawings illustrating a second embodiment of a yoke clamp for a deflection yoke according to the present invention, and FIG. 7 is an exploded, perspective view for fastening portion of a yoke clamp in a deflection yoke according to the present invention, FIG. 8 is a drawing illustrating a yoke clamp in a deflection yoke according to the present invention, FIG. 9 is a drawing illustrating fastening status for a yoke clamp in a deflection yoke of the present invention.

Hereinafter, detailed description of a yoke clamp will be made with reference to FIG. 4 through FIG. 6, with same reference numeral given for same element.

As shown in the pictures, characteristics of a deflection yoke according to the present embodiment, lie in forming a slit 25*a* of a long hole shape on a fastening band 21 so that fastening force of a yoke clamp 20 may be distributed during process of mounting a deflection yoke 4 on an electron gun portion 3 of a CRT 1.

Namely, as shown in FIG. 7 and FIG. 9, the yoke clamp 20 is configured such that fastening band 21 generates fastening force through fastening of a bolt 30 and a nut 31, with being mounted on the neck portion 12 of the described coil separator 10.

Such fastening force of the yoke clamp 20 is transferred to an outer periphery of the neck portion 12 through the fastening band 21 substantially. At the moment, the fastening band 21 has a plurality of the slit 25*a* of a long hole shape on a middle portion in a width direction, for distributing the fastening force. Preferably, a plurality of the slits 25*a* is formed along a periphery of the fastening band 21.

When the slit 25*a* of a long hole shape is formed on the middle portion in the width direction of the fastening band 21 as described above, an object contact plane of the fastening band, for coming in contact with an outer periphery of the neck portion 12, is divided into two sides with the slit 25*a* centered and divided contact planes 26*a*, 27*a* are formed.

In the meantime, though representing a case in which a pair of the slits 25*a* is formed on a periphery of the fastening band 21, the present invention is not restricted to this case, and a shape of the slit 25*a*, its position and the number of the slits 25*a* formed will be varied, provided that the fastening band 21 is configured such that its contact plane, i.e., the inner contact plane of the fastening band 21, for coming in contact with the outer periphery of the neck portion 12 in the coil separator 10, is divided at least two or more and fastening force could be distributed accordingly.

In the meantime, a width of the slit 25*a* could be formed by about 50% of a width of the fastening band 21.

As is apparent from the present embodiment having the foregoing configuration, the fastening band 21 has, along its periphery, a plurality of the slits 25*a*, whereby the object contact planes coming in contact with the outer periphery of the neck portion 12 in the coil separator 10, is divided into both sides with the slits 25*a* centered, and divided contact planes 26*a*, 27*a* are formed, and by such configuration, fastening force exerted by the fastening band 21 is distributed through the divided contact planes 26*a*, 27*a*.

Therefore, the fastening force of the fastening band 21 is exerted on an outer periphery of the neck portion 12 through the two divided contact planes 26*a*, 27*a* and transferred to the electron gun portion 3 of the CRT 1. Namely, as the fastening force of the yoke clamp 20 exerted on the CRT 1 is distributed and transferred through the divided contact planes, whereby destruction of the electron gun portion 3 of the CRT 1 due to the partially exerted excessive fastening force, could be reduced.

As is apparent from the foregoing, a yoke clamp for a deflection yoke according to the present invention, provides strong points in that a slit of a long hole shape formed along the periphery of the fastening band, distributes fastening force through divided contact planes, whereby resultantly the fastening force of the yoke clamp exerted on the electron gun portion of the CRT, is distributed, and destruction during assembly process is reduced accordingly.

Therefore, destruction of the CRT during fastening process of the yoke clamp is reduced remarkably, whereby work and production efficiencies are improved and product reliability is secured.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A deflection yoke comprising:

a coil separator of a conic shape, having a screen portion of a large diameter and a neck portion of a small diameter, for being combined to a screen plane and an electron gun portion of the CRT, respectively, and having a horizontal deflection coil and a vertical deflection coil on its inner periphery and outer periphery, respectively;

a fastening band of a ring shape assembled on an outer periphery of the neck portion in the coil separator by a fixing manner, provided for being extended and contracted;

a yoke clamp including fastening members to assemble the fastening band; and a bending portion projected on an outer side along the periphery of the fastening band, whose object contact plane for coming in contact with an outer periphery of the neck portion is divided into at least two or more.

2. The deflection yoke according to claim 1, wherein at least two or more of the bending portions are provided along the periphery of the fastening band with some interval intervened, and are formed on a middle portion in a width direction of the fastening band.

3. The deflection yoke according to claim 1, wherein the bending portion is formed on the middle portion in a width direction such that its width is about 50% of a width of the fastening band.

4. The deflection yoke according to claim 1, wherein, for being assembled to a pair of flanges bent and extended from both ends of the fastening band, a bolt for passing through a pair of through holes, and a nut for being tightened to this bolt are included.

5. A deflection yoke comprising:

a coil separator of a conic shape, having a screen portion of a large diameter and a neck portion of a small diameter, for being combined to a screen plane and an electron gun portion of the CRT, respectively, and having a horizontal deflection coil and a vertical deflection coil on its inner periphery and outer periphery, respectively;

a fastening band of a ring shape assembled on an outer periphery of the neck portion in the coil separator by a fixing manner, provided for being extended and contracted, a yoke clamp including fastening members to assemble the fastening band; a bending portion projected on an outer side along the periphery of the fastening band, whose object contact plane for coming in contact with an outer periphery of the neck portion is divided into at least two or more; and a slit of a long hole shape provided on a middle portion in a width direction along a periphery of the fastening band, for distributing, and transferring fastening force by dividing object contact plane come in contact with an outer periphery of the neck portion into at least two or more.

6. The deflection yoke according to claim 5, wherein at least two or more of the slits are provided along the periphery of the fastening band with some interval intervened.

7. The deflection yoke according to claim 5, wherein the slit is formed on a middle portion in a width direction such that its width is about 50% of a width of the fastening band.

8. The deflection yoke according to claim 5, wherein the fastening members for being assembled to a pair of flanges bent and extended from both ends of the fastening band, include a bolt for passing through a pair of through holes, and a nut for being tightened to this bolt.

* * * * *